UNITED STATES PATENT OFFICE.

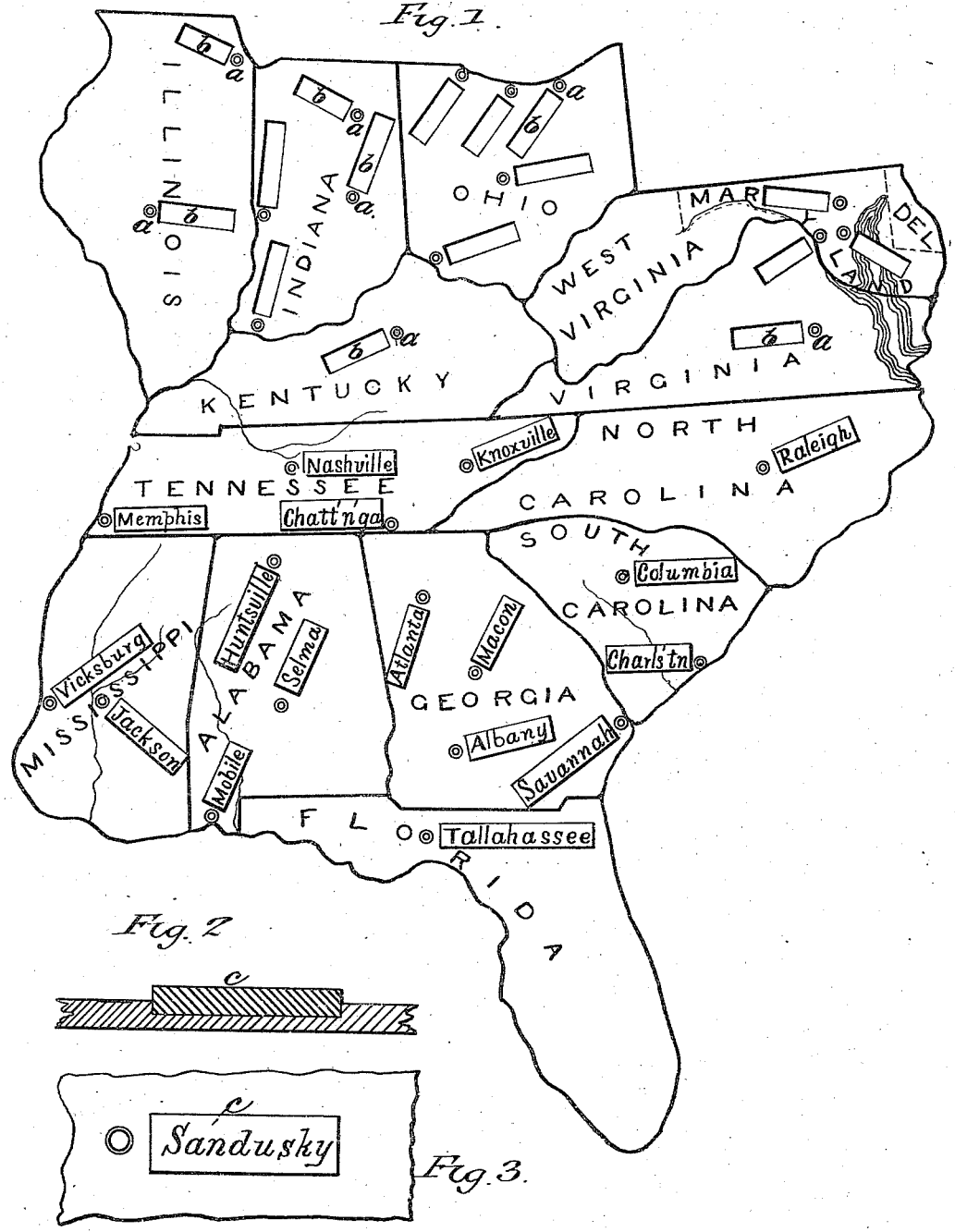

WILLIAM R. NORRIS, OF FORT ANN, NEW YORK.

EDUCATIONAL MAP.

SPECIFICATION forming part of Letters Patent No. 279,268, dated June 12, 1883.

Application filed August 10, 1881. (No model.)

*To all whom it may concern:*

Be it known that I, WILLIAM R. NORRIS, of Fort Ann, in the county of Washington and State of New York, have invented an Improvement in Educational Maps, of which the following is a specification.

This invention is designed to enable the pupil in geography to fix in the memory the location of cities and other localities of interest (meaning thereby cities, towns, mines, bridges, government stations, and other places or objects of note or importance) with much greater permanence and certainty than by the usual method of teaching with ordinary maps; and it depends upon the principle that where the faculties of observation are called into exercise upon any subject that topic or any specific portion thereof will be more firmly imprinted in the mind than if the fact were ascertained with little or no intellectual effort.

In my invention I provide a map constructed with indicia of the more important localities, but without the names of those localities affixed directly to the map itself, the latter being, however, provided with sockets or recesses for receiving separate blocks or labels bearing the names of the localities, so that the blocks or labels being separated at random the ingenuity of the pupil is exercised in fitting the proper label in juxtaposition to the indication of any specific place, so that after a few repetitions of the operation the name of the location becomes inseparably associated with its indicated place upon the map, so that a knowledge of the locality of cities, towns, mountains, &c., is permanently retained by the pupil. By providing the map with the cavities or recesses for the reception of the blocks or labels, as aforesaid, I secure many advantages in the manufacture, construction, and operation of the apparatus—such, for example, as extreme facility in printing upon the blocks or labels, and of cutting the printed sheet into a very large number of the blocks or labels by means of a die at a single blow; also, great economy in the material required for the blocks or labels; and, futhermore, very secure retention of the blocks or labels in their places upon the map when applied in position, as hereinbefore set forth.

Figure 1 is a plan or top view of a map constructed according to my invention, the lower portion of the map being represented as having the blocks or labels arranged in suitable relation to the indicia of various localities, whereas the upper portion of the said figure represents the indicia, in connection with the mechanical means for retaining the labels in place when properly arranged. Fig. 2 is a vertical sectional view, and Fig. 3 a plan view, on a larger scale, showing the manner in which the blocks or labels are retained in position with reference to the indicia of localities on the map.

Upon the map, at each locality to be indicated, is formed a mark of any suitable shape—as, for example, two concentric rings, as shown at *a*. These marks constitute the indicia of the localities to be impressed upon the memory of the learner. Thus, for example, one mark in the subdivision Illinois of the map will indicate the locality of Chicago, another in the division Alabama will indicate Selma or Huntsville, as the case may be, and so on of every subdivision.

Adjacent to each of the indicia is formed a recess or socket, *b*, which may be most conveniently of rectangular and oblong form, as represented in the drawings, the material of which the map is made being of a thickness to permit these cavities, indentations, or recesses *b* to be formed in its upper side.

The blocks or labels are indicated at *c*, and should be made of some material—such, for example, as pasteboard—which will afford them sufficient thickness and rigidity to enable them to be conveniently handled, and to permit them to be placed in the cavities or recesses *b*, these blocks having imprinted upon them the names of the localities, each block bearing the name of one locality, and each block being of a size to fit into one or the other of the cavities or recesses *b*.

It is manifest that when the block or label marked, for example, "Sandusky" is placed in the recess or cavity *b* adjacent to that one of the indicia which indicates the position of Sandusky on the map that the word "Sandusky" will be in such relation to said one of the indicia or marks *a* as to correctly indicate to the learner the position of Sandusky upon the map, and inasmuch as considerable patience and the exercise of no small degree of judgment is required to place the proper block or label c in the proper recess or cavity b, even after the pupil has once been instructed on this point, it follows that the intellectual effort required to place the various labels in connection with the respective indicia of the places named on the labels is sufficient to fix the geographical position of the several localities with much more permanence in the mind of the learner than when such localities are ascertained with the comparatively slight intellectual effort involved in the ordinary maps. In other words, my said invention, by calling out the attempts of the mind to associate and delineate upon the map the positions of the various localities by fitting the various blocks or labels in their proper places, produces a much greater educational effect and a more thorough and permanent teaching of the principles of geography than is possible by the mere passive exercise of the mind in glancing upon a map of the ordinary kind.

The term "indicia," as used in this specification, is intended to mean any mark, impression, or device provided upon the map in such manner or position as to indicate or enable to be ascertained the position of places or objects of interest upon the map.

By providing the map with cavities or recesses, as described, adapted to receive the blocks or labels, I avoid the liability of the breaking of pins or studs, which would occur if the blocks or labels were attached by means of such pins or studs.

What I claim as my invention is—

As a new article of manufacture, an educational map provided with indicia of localities, and constructed with cavities or recesses for receiving blocks or labels of corresponding shape, bearing the name of the several localities, all substantially as and for the purpose herein set forth.

WILLIAM R. NORRIS.

Witnesses:
E. A. LEWIS,
WILLIAM P. MOORE.